United States Patent
Stauss

(10) Patent No.: US 11,927,714 B2
(45) Date of Patent: Mar. 12, 2024

(54) SCANNER FOR DIFFERENTIATING OBJECTS BEHIND AN OPAQUE SURFACE

(71) Applicant: Zircon Corporation, Campbell, CA (US)

(72) Inventor: John Robert Stauss, Los Gatos, CA (US)

(73) Assignee: Zircon Corporation, Campbell, CA (US)

( * ) Notice: Subject to any disclaimer, the term of this patent is extended or adjusted under 35 U.S.C. 154(b) by 41 days.

(21) Appl. No.: 17/369,853

(22) Filed: Jul. 7, 2021

(65) Prior Publication Data

US 2022/0011460 A1    Jan. 13, 2022

Related U.S. Application Data

(60) Provisional application No. 63/050,103, filed on Jul. 9, 2020.

(51) Int. Cl.
  *G01V 3/38*    (2006.01)
(52) U.S. Cl.
  CPC ..................................... *G01V 3/38* (2013.01)
(58) Field of Classification Search
  CPC ............................... G01V 3/38; G01V 3/165
  See application file for complete search history.

(56) References Cited

U.S. PATENT DOCUMENTS

| | | | |
|---|---|---|---|
| 2007/0176608 A1* | 8/2007 | Mackey | G01D 5/2415 324/660 |
| 2011/0215815 A1 | 9/2011 | Dorrough | |
| 2017/0370868 A1 | 12/2017 | Eldinger et al. | |

OTHER PUBLICATIONS

International Search Report and Written Opinion dated Oct. 6, 2021, from PCT Application No. PCT/US2021/40953, filed Jul. 8, 2021.
International Preliminary Report on Patentability dated Jan. 19, 2023, from PCT Application No. PCT/US2021/040953, filed Jul. 8, 2021.

* cited by examiner

*Primary Examiner* — Eman A Alkafawi
*Assistant Examiner* — Sangkyung Lee
(74) *Attorney, Agent, or Firm* — Silicon Valley Patent Group LLP; Thomas C. Chan

(57) ABSTRACT

Aspects of the present invention include a system and method for differentiating one or more objects detected behind an opaque surface, comprising, collecting, by one or more sensors, sensor data of the one or more objects behind the opaque surface along a scan path of a scanner; identifying, by one or more processors, signal strengths detected by the one or more sensors using the sensor data; analyzing, by the one or more processors, the signal strengths detected by the one or more sensors to differentiate one or more estimated regions of the one or more objects behind the opaque surface; and informing a user, by the one or more processors via a user interface, of the one or more estimated regions of the one or more objects behind the opaque surface.

20 Claims, 10 Drawing Sheets

SCANNER FOR DIFFERENTIATING OBJECTS BEHIND AN OPAQUE SURFACE

CROSS REFERENCE TO RELATED APPLICATIONS

This application claims the benefit of U.S. provisional application No. 63/050,103, "Scanner for Differentiating Objects behind an Opaque Surface," filed Jul. 9, 2020, assigned to the assignee hereof. The aforementioned United States application is hereby incorporated by reference in its entirety.

FIELD

The present invention relates to the field of scanners for differentiating one or more objects detected behind an opaque surface.

BACKGROUND

As an example, stud finders have been commonly used in construction and home improvement industries. FIG. 1 illustrates a side view of a conventional scanner. As shown in FIG. 1, a scanner 102 may be used in a construction and home improvement environment 100. For example, scanner 102 may be configured to detect an object 101 behind an opaque surface 103. In some exemplary applications, object 101 may be a stud, an electrical wire, or a metal pipe. In one exemplary embodiment, the stud may be a wooden stud, vertical wooden element, bridging block, fire block, or any other block, joists, rafters, headers, posts, columns, let brace, or any similar wooden element used for integrity, fabrication, or maintenance of a structural element. In one exemplary embodiment, opaque surface 103 may be, for example, a wall covered with drywall, particle board, or plywood; as an example, a floor with opaque material attached to structural members; as an example, a ceiling with an opaque surface, attached to rafters; or any other opaque surface behind which objects are not visible through the surface.

In one exemplary embodiment, scanner 102 may include a housing to enclose and protect various electronic components. For example, within the housing of the scanner 102, it may include a printed circuit board (PCB) 104, which can be configured to hold the various electronic components, such as one or more capacitive sensors 108, one or more metal sensors 109, one or more current sensors (not shown), a controller/processor and other integrated circuits (labelled as 106a and 106b). The PCB 104 may be coupled to a battery 107, which provides power to the scanner 102. In conventional applications, the one or more capacitive sensors 108, one or more metal sensors 109, and one or more current sensors are typically operated individually or separately. In addition, conventional stud finders may falsely report electrical wires, plastic water pipes or metal water pipes as studs. Besides the risk of damaging the electrical wires and water pipes, such false reports may lead to hazards that can injure the user.

Therefore, there is a need for a scanner that can address the above drawbacks of the conventional scanner in differentiating one or more objects detected behind an opaque surface.

SUMMARY

Aspects of the present invention include a method for differentiating one or more objects detected behind an opaque surface includes collecting, by one or more sensors, sensor data of the one or more objects behind the opaque surface along a scan path of a scanner; identifying, by one or more processors, signal strengths detected by the one or more sensors using the sensor data; analyzing, by the one or more processors, the signal strengths detected by the one or more sensors to differentiate one or more estimated regions of the one or more objects behind the opaque surface; and informing a user, by the one or more processors via a user interface, of the one or more estimated regions of the one or more objects behind the opaque surface. Note that the one or more sensors include one or more capacitive sensors, metal sensors, and current sensors.

According to aspects of the present disclosure, the method of analyzing the signal strengths detected by the one or more sensors further includes determining a rate of change of the signal strengths detected by one or more capacitive sensors, and differentiating the one or more estimated regions of the one or more objects behind the opaque surface based on the rate of change of the signal strength detected. The rate of change of signal strengths includes a pattern of a first increasing rate of change of signal strength, follow by a first decreasing rate of change of signal strength, where the first decreasing rate of change of signal strength occurs within close proximity of a first type of object behind the opaque surface. For two or more objects within close proximity of each other, the rate of change of signal strength further includes a pattern of a second increasing rate of change of signal strength, and then follow by a second decreasing rate of change of signal strength, where the second decreasing rate of change of signal strength occurs within close proximity of a second type of object behind the opaque surface.

The method of analyzing the signal strengths detected by the one or more sensors further includes classifying the signal strengths detected into one or more estimated regions according to a set of predetermined reference signal strengths for different types construction materials, and identifying the one or more estimated regions of the one or more objects behind the opaque surface based on the predetermined reference signal strengths. The set of predetermined reference signal strengths includes a reference signal strength for a stud, a reference signal strength for an electrical wire, a reference signal strength for a metal pipe, and a reference signal strength for a plastic pipe.

The method further includes determining an estimated region of an object based on a classified signal strength of the object being one of wood stud, electrical wire, metal pipe, or plastic pipe. For an estimated region of the object being identified to be an electrical wire, the method further includes confirming the estimated region using the sensor data collected by the current sensors. For an estimated region of the object being identified as a metal pipe, the method further includes confirming the estimated region using the sensor data collected by the metal sensors.

A scanner for differentiating one or more objects detected behind an opaque surface includes one or more sensors, controller by one or more processors, configured to collect sensor data of the one or more objects behind an opaque surface along a scan path of the scanner; the one or more processors are configured to identify signal strengths detected by the one or more sensors using the sensor data; the one or more processors are further configured to analyze the signal strengths detected by the one or more sensors to differentiate one or more estimated regions of the one or more objects behind the opaque surface; and the one or more processors are further configured to inform a user, via a user interface, of the one or more estimated regions of the one or more objects behind the opaque surface.

In some implementations, the one or more sensors include one or more capacitive sensors, metal sensors, and current sensors. The one or more processors are further configured to determine a rate of change of the signal strengths detected by one or more capacitive sensors, and differentiate the one or more estimated regions of the one or more objects behind the opaque surface based on the rate of change of the signal strength detected. The rate of change of signal strengths includes a pattern of a first increasing rate of change of signal strength, follow by a first decreasing rate of change of signal strength, where the first decreasing rate of change of signal strength occurs within close proximity of a first type of object behind the opaque surface. For two or more objects within close proximity of each other, the rate of change of signal strength further includes a pattern of a second increasing rate of change of signal strength, and then follow by a second decreasing rate of change of signal strength, where the second decreasing rate of change of signal strength occurs within close proximity of a second type of object behind the opaque surface.

The one or more processors are further configured to classify the signal strengths detected into one or more estimated regions according to a set of predetermined reference signal strengths for different types construction materials, and identify the one or more estimated regions of the one or more objects behind the opaque surface based on the predetermined reference signal strengths, where the set of predetermined reference signal strengths includes a reference signal strength for a stud, a reference signal strength for an electrical wire, a reference signal strength for a metal pipe, and a reference signal strength for a plastic pipe.

The one or more processors are further configured to determine an estimated region of an object based on a classified signal strength of the object being one of wood stud, electrical wire, metal pipe, or plastic pipe. For an estimated region of the object being identified to be an electrical wire, the one or more processors are further configured to confirm the estimated region using the sensor data collected by the current sensors. For an estimated region of the object being identified as a metal pipe, the one or more processors are further configured to confirm the estimated region using the sensor data collected by the metal sensors.

BRIEF DESCRIPTION OF THE DRAWINGS

The aforementioned features and advantages of the invention, as well as additional features and advantages thereof, will be more clearly understandable after reading detailed descriptions of embodiments of the invention in conjunction with the non-limiting and non-exhaustive aspects of the following drawings Like numbers are used throughout the disclosure.

DESCRIPTION OF EMBODIMENTS

Methods and apparatuses are provided for differentiating one or more objects behind an opaque surface. The following descriptions are presented to enable a person skilled in the art to make and use the invention. Descriptions of specific embodiments and applications are provided only as examples. Various modifications and combinations of the examples described herein may be readily apparent to those skilled in the art, and the general principles defined herein may be applied to other examples and applications without departing from the scope of the invention. Thus, the present invention is not intended to be limited to the examples described and shown, but is to be accorded the scope consistent with the principles and features disclosed herein. The word "exemplary" or "example" is used herein to mean "serving as an example, instance, or illustration." Any aspect or embodiment described herein as "exemplary" or as an "example" is not necessarily to be construed as preferred or advantageous over other aspects or embodiments.

Some portions of the detailed description that follow are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

The drawings are presented for illustration purposes, and they are not drawn to scale. In some examples, rectangles, circles or other shapes are used to illustrate shapes of objects and their respective estimated shapes of the objects. In real world applications, the shapes of objects and their respective estimated shapes of the objects may be irregular and may be in any shapes or forms. Note that in the following figures, for each object, a section of the object, not the entire object, is shown. This also applies to the respective estimated shape of each object.

Figure 1:
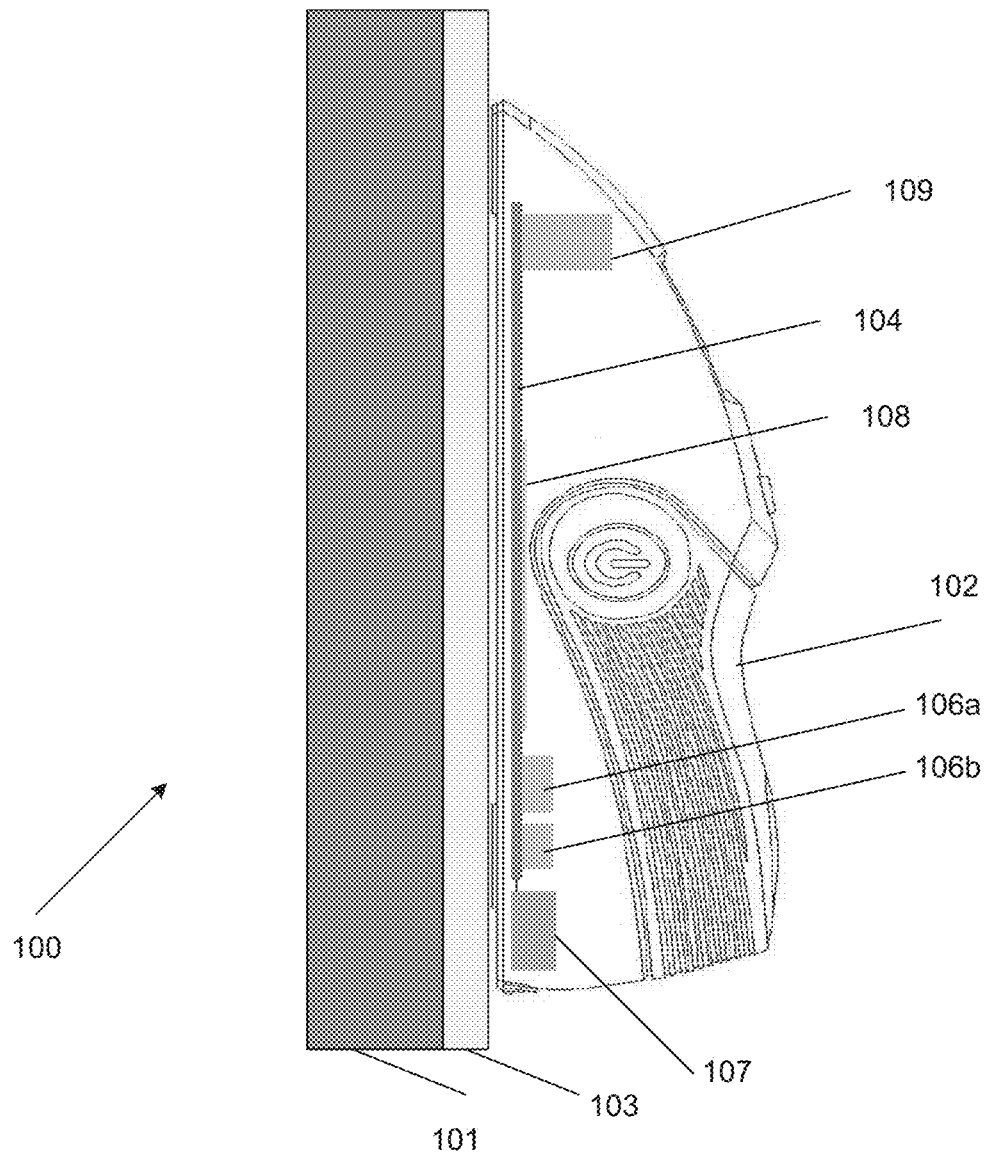
FIG. 1 illustrates a side view of a conventional scanner.
Figure 2A:
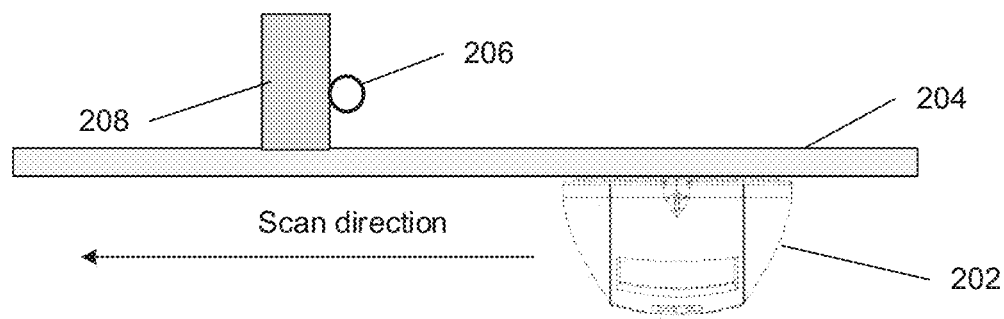
FIG. 2A illustrates a top view of an exemplary embodiment for differentiating one or more objects detected behind an opaque surface according to aspects of the present invention.

FIG. 2A illustrates a top view of an exemplary embodiment for differentiating one or more objects detected behind an opaque surface according to aspects of the present invention. As shown in FIG. 2A, the exemplary embodiment may include a scanner 202, an opaque surface 204, and one or more objects (labelled as 206, 208) behind the opaque surface 204. The scanner 202 may be configured to differentiate a variety of objects detected behind the opaque surface, including but not limited to, for example: 1) wood studs, wood joists, wood rafters; 2) plastic materials such as PVC pipes, ABS pipes, or PEX pipes; 3) electrical wires; or 4) other objects. In the example of FIG. 2A, object 206 may be a PVC pipe, and object 208 may be a wood stud.

Figure 2B:
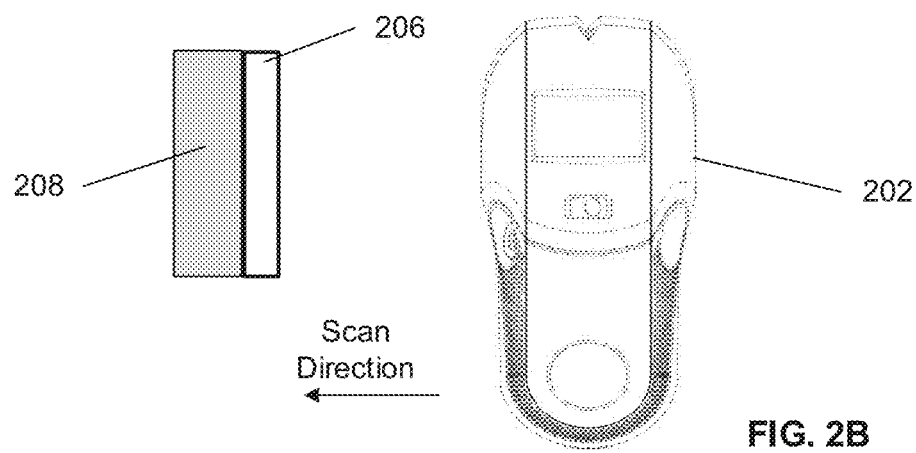
FIG. 2B illustrates a front view of the exemplary embodiment of FIG. 2A for differentiating one or more objects detected behind an opaque surface according to aspects of the present invention.

FIG. 2B illustrates a front view of the exemplary embodiment of FIG. 2A for differentiating one or more objects detected behind an opaque surface according to aspects of the present invention. In the example of FIG. 2B, the opaque surface is not shown for simplicity. As shown in FIG. 2A and FIG. 2B, the scan direction may be from right to left. A person skilled in the art would understand that the scan direction may be adjusted based on the working environment, the preference of the user, and the specific application. In other words, the scan direction may be from left to right, right to left, up to down, down to up, diagonally, or other patterns. In some applications, a user may perform multiple scans and/or from multiple directions to improve the accuracy of sensor data collected. Note that in the examples below, since the scan direction is from right to left, the rate of change of a corresponding signal strength profile is labelled to be increasing on the right side of an object and decreasing on the left side of the object. If the scan direction is from left to right, the rate of change of a corresponding signal strength profile is labelled to be increasing on the left side of an object and decreasing on the right side of the object.

Figure 2C:
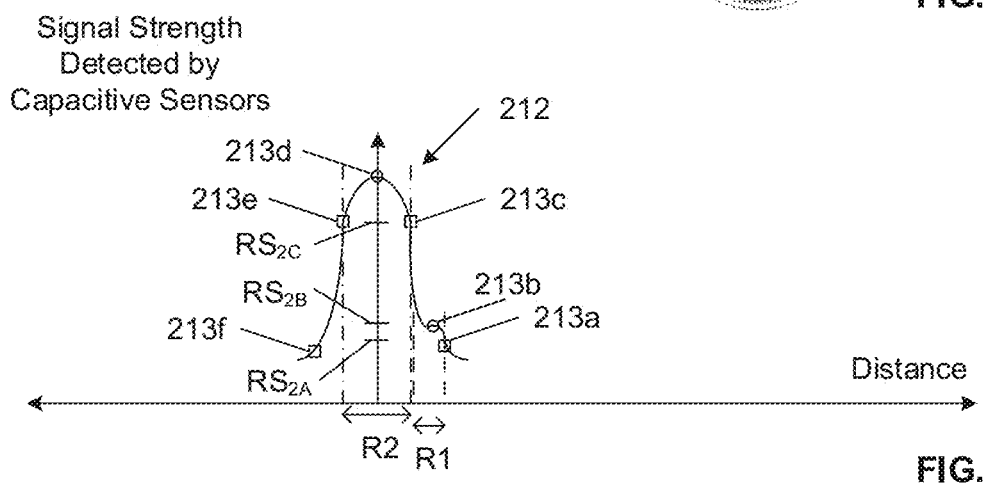
FIG. 2C illustrates an exemplary implementation of using signal strength profile of sensor data collected by the scanner of FIG. 2B to differentiate objects behind an opaque surface according to aspects of the present invention.

FIG. 2C illustrates an exemplary implementation of using signal strength profile of sensor data collected by the scanner of FIG. 2B to differentiate objects behind an opaque surface according to aspects of the present invention. In this example, the sensor data may be collected by one or more capacitive sensors of the scanner 202. The signal strength profile 212 may represent a change of capacitance due to the change in the density of the objects behind the opaque surface, which may include an indication of the density of object 206 and object 208. The vertical axis represents a magnitude of the signal strength profile 212 observed by the capacitive sensors, and the horizontal axis represents a distance of the capacitive sensors from the objects being detected. As the scanner 202 scans from right to left (as shown in FIG. 2B), the magnitude of the signal strength profile 212 being observed by the capacitive sensors changes, including various observation points, shown as 213a through 213f, which may be used to determine the objects detected behind the opaque surface 204.

In the example of FIG. 2C, the scanner 202 may observe the signal strength profile 212 starts to increase near point 213a. As the scanner 202 continues to move from right to left, the signal strength profile 212 may reach a first plateau at point 213b. The signal strength profile 212 may decrease slightly after the first plateau at point 213b and then continue to increase to point 213c, and reach a second plateau at point 213d, which is the point that shows the strongest signal strength. After point 213d, the signal strength 212 decreases to point 213e, and it continues to decrease to point 213f as the scanner 202 continues to scan to the left.

According to aspects of the present invention, a first reference signal strength ($RS_{2A}$), a second reference signal strength ($RS_{2B}$), and a third reference signal strength ($RS_{2C}$) may be used to identify the boundaries of objects detected behind the opaque surface 204. For example, the region R1 between points 213a and 213c has a signal strength at or above $RS_{2A}$, and this region may be estimated to be where object 206 is located. At around $RS_{2B}$, it may give an indication of a center of the object 206 as the signal strength profile 212 reaches a local plateau at 213b. The region R2 between points 213c and 213e has a signal strength at or above $RS_{2C}$, and this region may be estimated to be where object 208 is located. At around point 213d, where the signal strength profile 212 reaches the second plateau, it may give an indication of a center of the object 208. For the regions outside of the points 213a and 213f, they have a signal strength below $RS_{2A}$, and these regions may be deemed to be where no object is found.

According to aspects of the present invention, the rates of change of the signal strength profile 212 may also be employed to estimate locations of objects behind the opaque surface 204. In the example of FIG. 2C, the rate of change of the signal strength increases to approximately point 213a, reaching the level of $RS_{2A}$, indicating the scanner 202 is moving towards object 206. Then, the rate of change of the signal strength decreases after point 213a and continues to decrease after it passes the plateau at point 213b, indicating region R1 where object 206 may be behind the opaque surface 204. Then, the rate of change of signal strength increases again to approximately point 213c, then decreases after point 213c and continues to decrease after it passes the plateau at point 213d, indicating region R2 where object 208 may be behind the opaque surface 204. After point 213e, the rate of change of signal strength continues to decrease below $RS_{2C}$ and $RS_{2B}$, indicating that the scanner 202 is moving away from object 208. By tracking the signal strength profile 212 with respect to reference signal strengths, an object that exhibits relatively weak signal strength (e.g. object 206 in region R1) and an object that exhibits relatively strong signal strength (e.g. object 208 in region R2) can be detected and identified as a PVC pipe and a wood stud, respectively.

Note that the first reference signal strength $RS_{2A}$, the second reference signal strength $RS_{2B}$, and the third reference signal strength $RS_{2C}$ may be derived from empirical experimental data. In addition, the first reference signal strength $RS_{2A}$, the second reference signal strength $RS_{2B}$, and the third reference signal strength $RS_{2C}$ may be programmable, and may be revised via a software update even after the scanner has been sold, the delivery methods of which are well known to those skilled in the art. Note that although a right to left scan is described in this example, similar observations may be obtained by a scan from left to right. In some applications, multiple scans from different directions may be used to improve the accuracy of the estimated boundaries of objects 206 and 208. By tracking the rate of change of the signal strength profile 212, an object that exhibits relatively weak signal strength (e.g. object 206 in region R1) and an object that exhibits relatively strong signal strength (e.g. object 208 in region R2) can be detected and identified as a PVC pipe and a wood stud, respectively. Note that the method of tracking rate of change of the signal strength profile 212 may be combined with the method of tracking the signal strength profile 212 with respect to reference signal strengths to further improve the predictability of the objects behind the opaque surface 204.

Figure 3A:
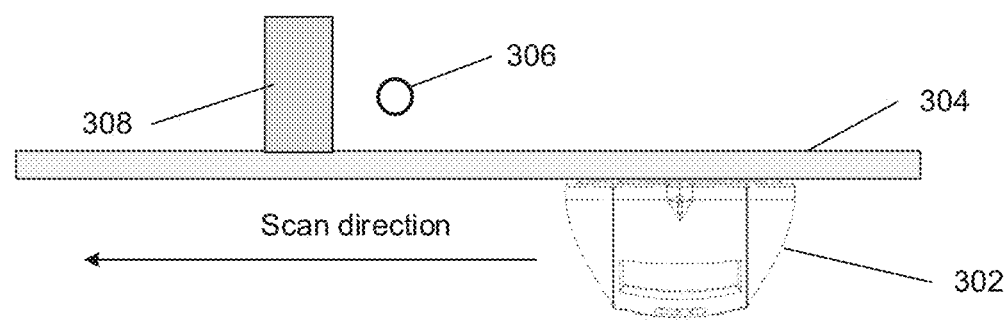
FIG. 3A illustrates a top view of another exemplary embodiment for differentiating one or more objects detected behind an opaque surface according to aspects of the present invention.

FIG. 3A illustrates a top view of another exemplary embodiment for differentiating one or more objects detected behind an opaque surface according to aspects of the present invention. As shown in FIG. 3A, the exemplary embodiment may include a scanner 302 and one or more objects (labelled as 306 and 308) behind an opaque surface 304. Object 306 may be a plastic pipe, and object 308 may be a wood stud. The setup is similar to that of FIG. 2A, except there is a gap between object 306 and object 308. Certain aspects of this exemplary embodiment are similar to that of FIG. 2A, which are not repeated here.

Figure 3B:
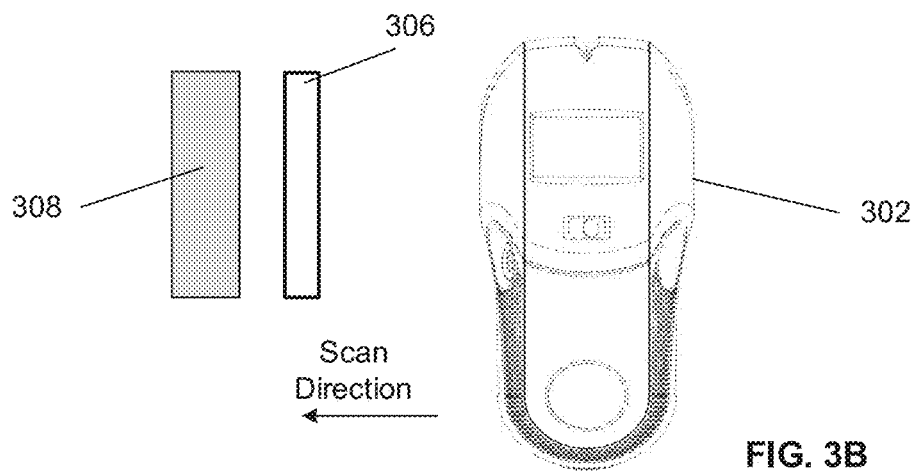
FIG. 3B illustrates a front view of the exemplary embodiment of FIG. 3A for differentiating one or more objects detected behind an opaque surface according to aspects of the present invention.

FIG. 3B illustrates a front view of the exemplary embodiment of FIG. 3A for differentiating one or more objects detected behind an opaque surface according to aspects of the present invention. As shown in FIG. 3B, the opaque surface is not shown for simplicity. As shown in FIG. 3A and FIG. 3B, the scan direction may be from right to left. A person skilled in the art would understand that the scan direction may be adjusted based on the working environment, the preference of the user, and the specific application. In other words, the scan direction may be from left to right, right to left, up to down, down to up, diagonally, or other patterns. In some applications, a user may perform multiple scans and/or from multiple directions to improve the accuracy of sensor data collected.

Figure 3C:
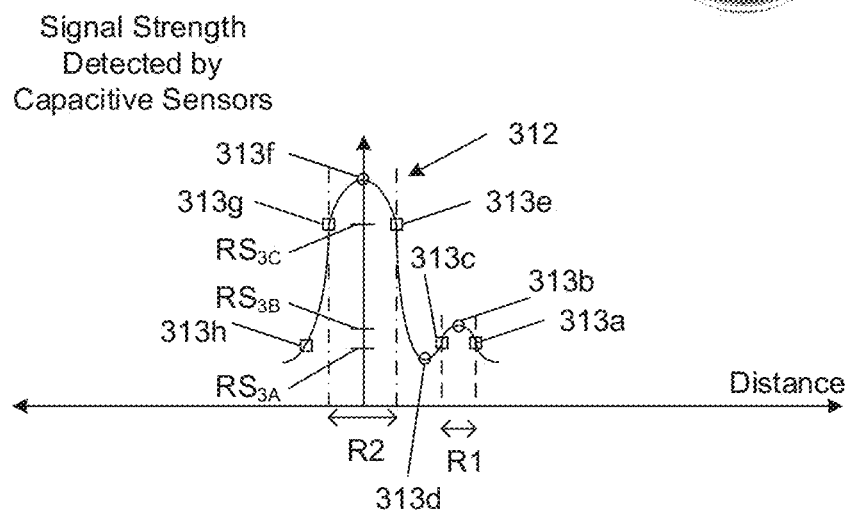
FIG. 3C illustrates an exemplary implementation of using signal strength profile of sensor data collected by the scanner of FIG. 3B to differentiate objects behind an opaque surface according to aspects of the present invention.

FIG. 3C illustrates an exemplary implementation of using signal strength profile of sensor data collected by the scanner of FIG. 3B to differentiate objects behind an opaque surface according to aspects of the present invention. In this example, the sensor data may be collected by one or more capacitive sensors of the scanner 302. The signal strength profile 312 may represent a change of capacitance due to the change in the density of the objects behind the opaque surface 304, which may include an indication of the density of object 306 and object 308. The vertical axis represents a magnitude of the signal strength profile 312 observed by the capacitive sensors, and the horizontal axis represents a distance of the capacitive sensors from the objects being detected. As the scanner 302 scans from right to left (as shown in FIG. 3B), the magnitude of the signal strength profile 312 being observed by the capacitive sensors changes, including various observation points, shown as 313a through 313h, which may be used to determine the objects detected behind the opaque surface 304.

In the example of FIG. 3C, the scanner 302 may observe the signal strength profile 312 starts to increase near point 313a. As the scanner 302 continues to move from right to left, the signal strength profile 312 may reach a first plateau at point 313b, and it may then decrease to point 313c. As the scanner 302 continues to move to the left, the scanner 302 may reach a region between object 306 and 308, where the signal strength profile may reach a local minimum at point 313d. After point 313d, the signal strength profile 312 may increase to point 313e, and then reach a second plateau at point 313f, which is the point that shows the strongest signal strength. After point 313f, the signal strength 312 decreases to point 313g, and the signal strength continues to decrease to point 313h as the scanner 302 continues to scan to the left.

According to aspects of the present invention, a first reference signal strength ($RS_{3A}$), a second reference signal strength ($RS_{3B}$), and a third reference signal strength ($RS_{3C}$) may be used to identify the boundaries of objects detected behind the opaque surface 304. For example, the region R1 between points 313a and 313c has a signal strength at or above $RS_{3A}$, and this region may be estimated to be where object 306 is located. At around $RS_{3B}$, it may give an indication of a center of the object 306 as the signal strength profile 312 reaches a local plateau at 313b. The region R2 between points 313e and 313g has a signal strength at or above $RS_{3C}$, and this region may be estimated to be where object 308 is located. At around point 313f, where the signal strength profile 312 reaches the second plateau, it may give an indication of a center of the object 308. For the regions outside of the points 313a and 313h, they have a signal strength below $RS_{3A}$, and these regions may be deemed to be where no object is found. By tracking the signal strength profile 312 with respect to reference signal strengths, an object that exhibits relatively weak signal strength (e.g. object 306 in region R1) and an object that exhibits relatively strong signal strength (e.g. object 308 in region R2) can be detected and identified as a plastic pipe and a wood stud, respectively.

According to aspects of the present invention, the rates of change of the signal strength profile 312 may also be employed to estimate locations of objects behind the opaque surface 304. In the example of FIG. 3C, the rate of change of the signal strength increases to approximately point 313a, reaching the level of $RS_{3A}$, indicating the scanner 302 is moving towards object 306. Then, the rate of change of the signal strength decreases after point 313a and continues to decrease after it passes the plateau at point 313b, indicating region R1 where object 306 may be behind the opaque surface 304. After point 313c and 313d, the rate of change of signal strength increases again to approximately point 313e, then it decreases after point 313e and continues to decrease after it passes points 313f and 313g, indicating region R2 where object 308 may be behind the opaque surface 304. After point 313g, the rate of change of signal strength continues to decrease below $RS_{3C}$, $RS_{3B}$, and $RS_{3A}$, indicating that the scanner 302 is moving away from object 308. By tracking the rate of change of the signal strength profile 312, an object that exhibits relatively weak signal strength (e.g. object 306 in region R1) and an object that exhibits relatively strong signal strength (e.g. object 308 in region R2) can be detected and identified as a plastic pipe and a wood stud, respectively. Note that the method of tracking rate of change of the signal strength profile 312 may be combined with the method of tracking the signal strength profile 312 with respect to reference signal strengths to further improve the predictability of the objects behind the opaque surface 304.

Similar to the example shown in FIG. 2C, the first reference signal strength $RS_{3A}$, the second reference signal strength $RS_{3B}$, and the third reference signal strength $RS_{3C}$ may be derived from empirical experimental data. In addition, the first reference signal strength $RS_{3A}$, the second reference signal strength $RS_{3B}$, and the third reference signal strength $RS_{3C}$ may be programmable, and may be revised via a software update even after the scanner has been sold, the delivery methods of which are well known to those skilled in the art. Note that although a right to left scan is described in this example, similar observations may be obtained by a scan from left to right. In some applications, multiple scans from different directions may be used to improve the accuracy of the estimated boundaries of objects 306 and 308.

Figure 4A:
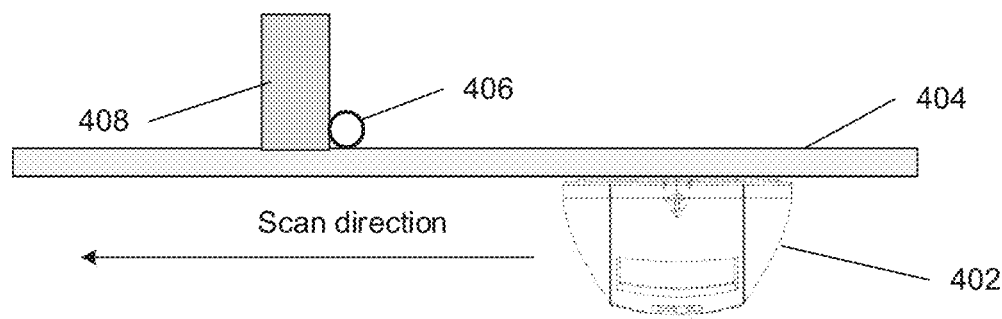
FIG. 4A illustrates a top view of yet another exemplary embodiment for differentiating one or more objects detected behind an opaque surface according to aspects of the present invention.

FIG. 4A illustrates a top view of yet another exemplary embodiment for differentiating one or more objects detected behind an opaque surface according to aspects of the present invention. As shown in FIG. 4A, the exemplary embodiment may include a scanner 402, an opaque surface 404, and one or more objects (labelled as 406, 408) behind the opaque surface 404. The scanner 402 may be configured to differentiate a variety of objects detected behind the opaque surface. In the example of FIG. 4A, object 406 may be a plastic pipe, and object 408 may be a wood stud.

Figure 4B:
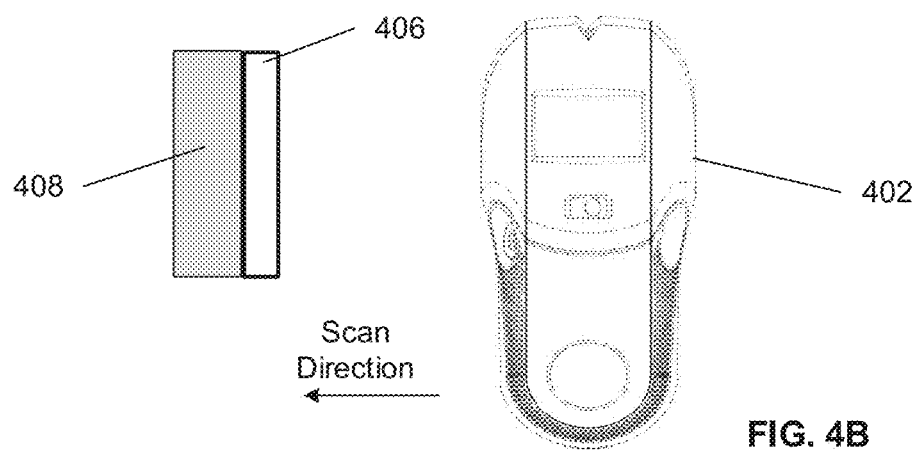
FIG. 4B illustrates a front view of the exemplary embodiment of FIG. 4A for differentiating one or more objects detected behind an opaque surface according to aspects of the present invention.

FIG. 4B illustrates a front view of the exemplary embodiment of FIG. 4A for differentiating one or more objects detected behind an opaque surface according to aspects of the present invention. In the example of FIG. 4B, the opaque surface is not shown for simplicity. Besides object 406 being a plastic pipe and being placed against the opaque surface 404, other items are similar to the items in FIG. 2B and the description of these items are not repeated for simplicity.

Figure 4C:
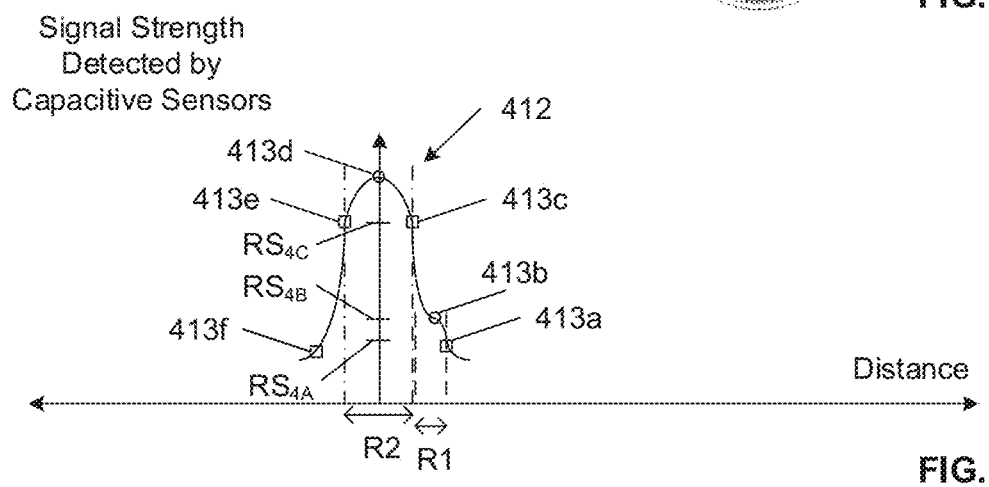
FIG. 4C illustrates an exemplary implementation of using signal strength profile of sensor data collected by the scanner of FIG. 4B to differentiate objects behind an opaque surface according to aspects of the present invention.

FIG. 4C illustrates an exemplary implementation of using signal strength profile of sensor data collected by the scanner of FIG. 4B to differentiate objects behind an opaque surface according to aspects of the present invention. In this example, the sensor data may be collected by one or more capacitive sensors of the scanner 402. The signal strength profile 412 may represent a change of capacitance due to the change in the density of the objects behind the opaque surface, which may include an indication of the density of object 406 and object 408. The vertical axis represents a magnitude of the signal strength profile 412 observed by the capacitive sensors, and the horizontal axis represents a distance of the capacitive sensors from the objects being detected. As the scanner 402 scans from right to left (as shown in FIG. 4B), the magnitude of the signal strength profile 412 being observed by the capacitive sensors changes, including various observation points, shown as 413a through 413f, which may be used to determine the objects detected behind the opaque surface 404.

In the example of FIG. 4C, the scanner 402 may observe the signal strength profile 412 starts to increase near point 413a. As the scanner 402 continues to move from right to left, the signal strength profile 412 may reach a first plateau at point 413b. After the first plateau at point 413b, the signal strength may continue to increase to point 413c, and then reach a second plateau at point 413d, which is the point that shows the strongest signal strength. After point 413d, the signal strength 412 decreases to point 413e, and it continues to decrease to point 413f as the scanner 402 continues to scan to the left.

According to aspects of the present invention, a first reference signal strength ($RS_{4A}$), a second reference signal strength ($RS_{4B}$), and a third reference signal strength ($RS_{4C}$) may be used to identify the boundaries of objects detected behind the opaque surface 404. For example, the region R1 between points 413a and 413c has a signal strength at or above $RS_{4A}$, and this region may be estimated to be where object 406 is located. At around $RS_{4B}$, it may give an indication of a center of the object 406 as the signal strength profile 412 reaches a local plateau at 413b. The region R2 between points 413c and 413e has a signal strength at or above $RS_{4C}$, and this region may be estimated to be where object 408 is located. At around point 413d, where the signal strength profile 412 reaches the second plateau, it may give an indication of a center of the object 408. For the regions outside of the points 413a and 413f, they have a signal strength below $RS_{4A}$, and these regions may be deemed to be where no object is found. By tracking the signal strength profile 412 with respect to reference signal strengths, an object that exhibits relatively weak signal strength (e.g. object 406 in region R1) and an object that exhibits relatively strong signal strength (e.g. object 408 in region R2) can be detected and identified as plastic pipe and a wood stud, respectively.

According to aspects of the present invention, the rates of change of the signal strength profile 412 may also be employed to estimate locations of objects behind the opaque surface 404. In the example of FIG. 4C, the rate of change of the signal strength increases to approximately point 413a, reaching the level of $RS_{4A}$, indicating the scanner 402 is moving towards object 406. Then, the rate of change of the signal strength decreases after point 413a and continues to decrease after it passes the plateau at point 413b, indicating region R1 where object 406 may be behind the opaque surface 404. Then, the rate of change of signal strength increases again to approximately point 413c, then it decreases after point 413c and continues to decrease after it passes the plateau at point 413d to point 413e, indicating region R2 where object 408 may be behind the opaque surface 404. After point 413e, the rate of change of signal strength continues to decrease below $RS_{4C}$, $RS_{4B}$, and $RS_{4A}$, indicating that the scanner 402 is moving away from object 408. By tracking the rate of change of the signal strength profile 412, an object that exhibits relatively weak signal strength (e.g. object 406 in region R1) and an object that exhibits relatively strong signal strength (e.g. object 408 in region R2) can be detected and identified as a plastic pipe and a wood stud, respectively. Note that the method of tracking rate of change of the signal strength profile 412 may be combined with the method of tracking the signal strength profile 412 with respect to reference signal strengths to further improve the predictability of the objects behind the opaque surface 404.

Figure 5A:
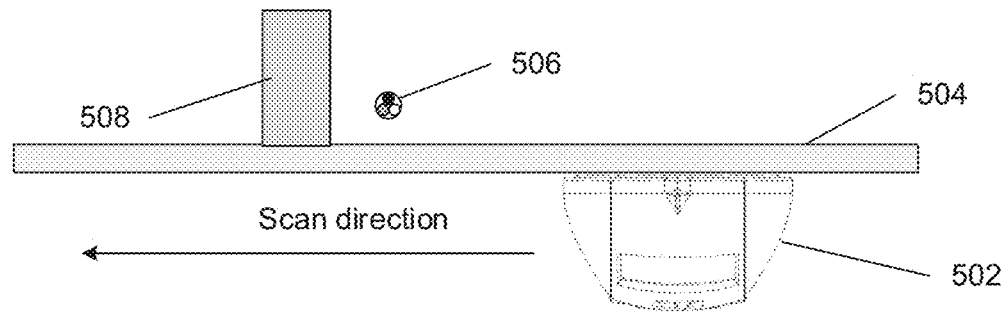
FIG. 5A illustrates a top view of yet another exemplary embodiment for differentiating one or more objects detected behind an opaque surface according to aspects of the present invention.

FIG. 5A illustrates a top view of yet another exemplary embodiment for differentiating one or more objects detected behind an opaque surface according to aspects of the present invention. As shown in FIG. 5A, the exemplary embodiment may include a scanner 502, an opaque surface 504, and one or more objects (labelled as 506, 508) behind the opaque surface 504. The scanner 502 may be configured to differentiate a variety of objects detected behind the opaque surface. In the example of FIG. 5A, object 506 may be an electrical cable, and object 508 may be a wood stud.

Figure 5B:
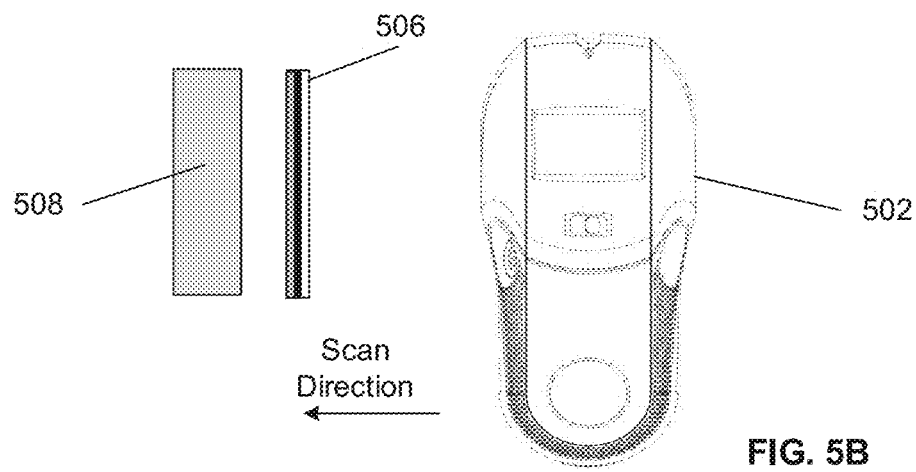
FIG. 5B illustrates a front view of the exemplary embodiment of FIG. 5A for differentiating one or more objects detected behind an opaque surface according to aspects of the present invention.

FIG. 5B illustrates a front view of the exemplary embodiment of FIG. 5A for differentiating one or more objects detected behind an opaque surface according to aspects of the present invention. In the example of FIG. 5B, the opaque surface is not shown for simplicity. Besides object 506 being an electrical cable, other items are similar to the items in FIG. 2B and the description of these items are not repeated for simplicity.

Figure 5C:
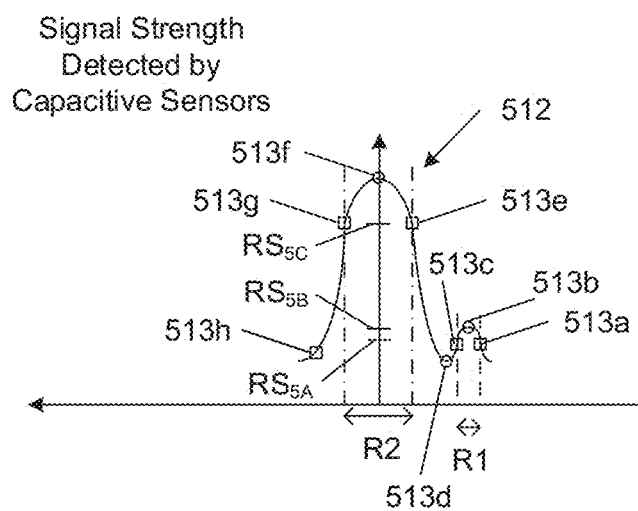
FIG. 5C illustrates an exemplary implementation of using signal strength profile of sensor data collected by the scanner of FIG. 5B to differentiate objects behind an opaque surface according to aspects of the present invention.

FIG. 5C illustrates an exemplary implementation of using signal strength profile of sensor data collected by the scanner of FIG. 5B to differentiate objects behind an opaque surface according to aspects of the present invention. In this example, the sensor data may be collected by one or more capacitive sensors of the scanner 502. The signal strength profile 512 may represent a change of capacitance due to the change in the density of the objects behind the opaque surface, which may include an indication of the density of object 506 and object 508. The vertical axis represents a magnitude of the signal strength profile 512 observed by the capacitive sensors, and the horizontal axis represents a distance of the capacitive sensors from the objects being detected. As the scanner 502 scans from right to left (as shown in FIG. 5B), the magnitude of the signal strength profile 512 being observed by the capacitive sensors changes, including various observation points, shown as 513a through 513h, which may be used to determine the objects detected behind the opaque surface 504.

In the example of FIG. 5C, the scanner 502 may observe the signal strength profile 512 starts to increase near point 513a. As the scanner 502 continues to move from right to left, the signal strength profile 512 may reach a first plateau at point 513b, and it may then decrease to point 513c. As the scanner 502 continues to move to the left, it may reach a region between object 506 and 508, where the signal strength profile may reach a local minimum at point 513d. After point 513d, the signal strength profile 512 may increase to point 513e, and then reach a second plateau at point 513f, which is the point that shows the strongest signal strength. After point 513f, the signal strength decreases to point 513g, and the signal strength continues to decrease to point 513h as the scanner 502 continues to scan to the left.

According to aspects of the present invention, a first reference signal strength ($RS_{5A}$), a second reference signal strength ($RS_{5B}$), and a third reference signal strength ($RS_{5C}$) may be used to identify the boundaries of objects detected behind the opaque surface 504. For example, the region R1 between points 513a and 513c has a signal strength at or above $RS_{5A}$, and this region may be estimated to be where object 506 is located. At around $RS_{5B}$, it may give an indication of a center of the object 506 as the signal strength profile 512 reaches a local plateau at 513b. The region R2 between points 513e and 513g has a signal strength at or above $RS_{5C}$, and this region may be estimated to be where object 508 is located. At around point 513f, where the signal strength reaches the second plateau, it may give an indication of a center of the object 508. For the regions outside of the points 513a and 513h, they have a signal strength below $RS_{5A}$, and these regions may be deemed to be where no object is found. By tracking the signal strength profile 512 with respect to reference signal strengths, an object that exhibits relatively weak signal strength (e.g. object 506 in region R1) and an object that exhibits relatively strong signal strength (e.g. object 508 in region R2) can be detected and identified as an electrical wire and a wood stud, respectively.

According to aspects of the present invention, the rates of change of the signal strength profile 512 may also be employed to estimate locations of objects behind the opaque surface 504. In the example of FIG. 5C, the rate of change of the signal strength increases to approximately point 513a, reaching the level of $RS_{5A}$, indicating the scanner 502 is moving towards object 506. Then, the rate of change of the signal strength decreases after point 513a and continues to decrease after it passes the plateau at point 513b, indicating region R1 where object 506 may be behind the opaque surface 504. After points 513c and 513d, the rate of change of signal strength increases again to approximately point 513e, then it decreases after point 513e and continues to decrease after it passes points 513f and 513g, indicating region R2 where object 508 may be behind the opaque surface 504. After point 513g, the rate of change of signal strength continues to decrease below $RS_{5C}$, $RS_{5B}$, and $RS_{5A}$, indicating that the scanner 502 is moving away from object 508. tracking the rate of change of the signal strength profile 512, an object that exhibits relatively weak signal strength (e.g. object 506 in region R1) and an object that exhibits relatively strong signal strength (e.g. object 508 in region R2) can be detected and identified as an electrical wire and a wood stud, respectively. Note that the method of tracking rate of change of the signal strength profile 512 may be combined with the method of tracking the signal strength profile 512 with respect to reference signal strengths to further improve the predictability of the objects behind the opaque surface 504.

Figure 6A:
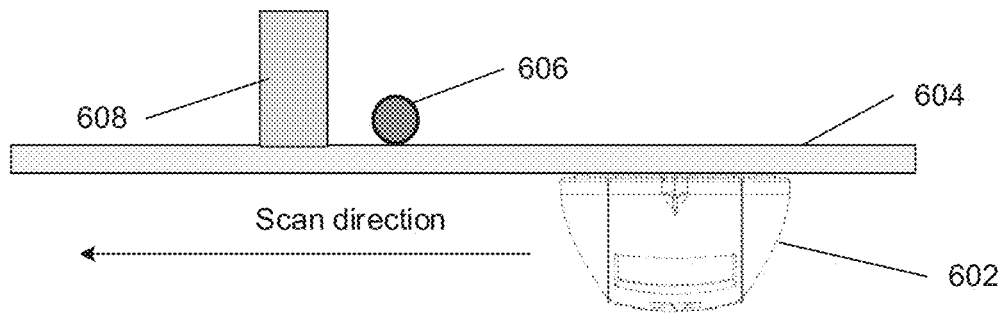
FIG. 6A illustrates a top view of yet another exemplary embodiment for differentiating one or more objects detected behind an opaque surface according to aspects of the present invention.

FIG. 6A illustrates a top view of yet another exemplary embodiment for differentiating one or more objects detected behind an opaque surface according to aspects of the present invention. As shown in FIG. 6A, the exemplary embodiment may include a scanner 602, an opaque surface 604, and one or more objects (labelled as 606, 608) behind the opaque surface 604. The scanner 602 may be configured to differentiate a variety of objects detected behind the opaque surface. In the example of FIG. 6A, object 606 may be a metal pipe, and object 608 may be a wood stud.

Figure 6B:
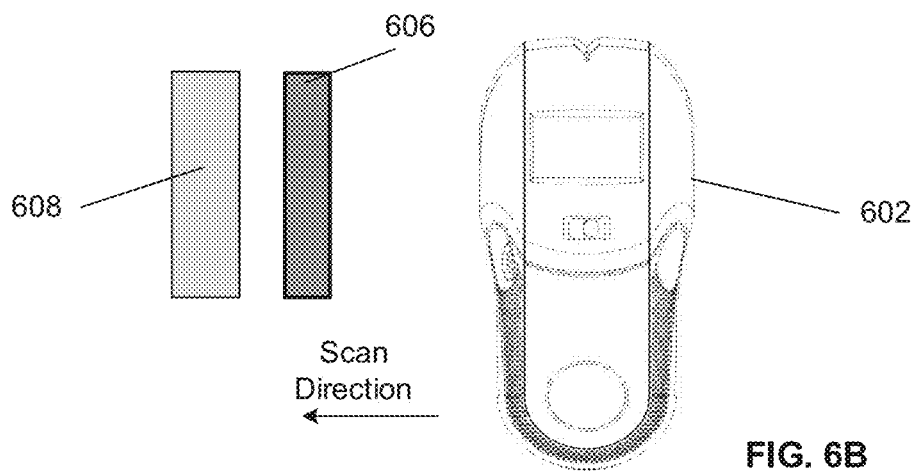
FIG. 6B illustrates a front view of the exemplary embodiment of FIG. 6A for differentiating one or more objects detected behind an opaque surface according to aspects of the present invention.

FIG. 6B illustrates a front view of the exemplary embodiment of FIG. 6A for differentiating one or more objects detected behind an opaque surface according to aspects of the present invention. In the example of FIG. 6B, the opaque surface is not shown for simplicity. Besides object 606 being a metal pipe, other items are similar to the items in FIG. 2B and the description of these items are not repeated for simplicity.

Figure 6C:
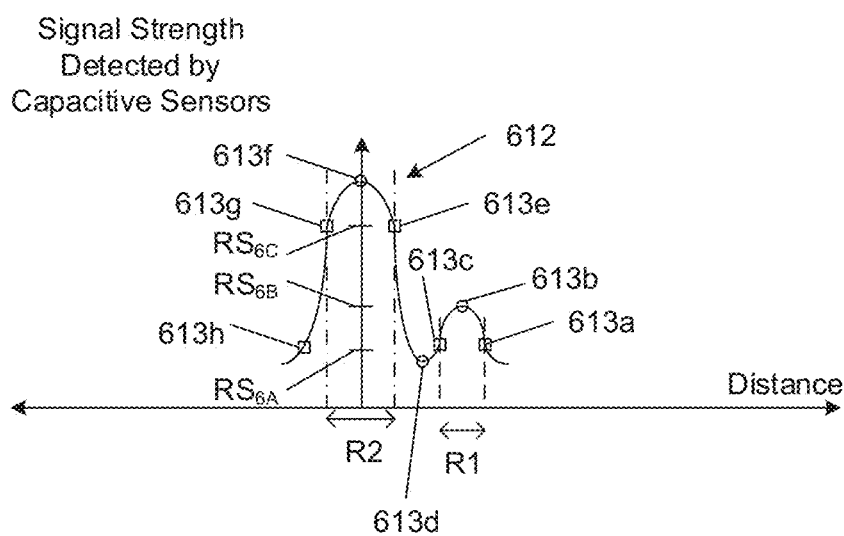
FIG. 6C illustrates an exemplary implementation of using signal strength profile of sensor data collected by the scanner of FIG. 6B to differentiate objects behind an opaque surface according to aspects of the present invention.

FIG. 6C illustrates an exemplary implementation of using signal strength profile of sensor data collected by the scanner of FIG. 6B to differentiate objects behind an opaque surface according to aspects of the present invention. In this example, the sensor data may be collected by one or more capacitive sensors of the scanner 602. The signal strength profile 612 may represent a change of capacitance due to the change in the density of the objects behind the opaque surface, which may include an indication of the density of object 606 and object 608. The vertical axis represents a magnitude of the signal strength profile 612 observed by the capacitive sensors, and the horizontal axis represents a distance of the capacitive sensors from the objects being detected. As the scanner 602 scans from right to left (as shown in FIG. 6B), the magnitude of the signal strength profile 612 being observed by the capacitive sensors changes, including various observation points, shown as 613a through 613h, which may be used to determine the objects detected behind the opaque surface 604.

In the example of FIG. 6C, the scanner 602 may observe the signal strength profile 612 starts to increase near point 613a. As the scanner 602 continues to move from right to left, the signal strength profile 612 may reach a first plateau at point 613b, and it may then decrease to point 613c. As the scanner 602 continues to move to the left, it may reach a region between object 606 and 608, where the signal strength profile may reach a local minimum at point 613d. After point 613d, the signal strength profile 612 may increase to point 613e, and then reach a second plateau at point 613f, which is the point that shows the strongest signal strength. After point 613f, the signal strength decreases to point 613g, and the signal strength continues to decrease to point 613h as the scanner 602 continues to scan to the left.

According to aspects of the present invention, a first reference signal strength ($RS_{6A}$), a second reference signal strength ($RS_{6B}$), and a third reference signal strength ($RS_{6C}$) may be used to identify the boundaries of objects detected behind the opaque surface 604. For example, the region R1 between points 613a and 613c has a signal strength at or above $RS_{6A}$, and this region may be estimated to be where object 606 is located. At around $RS_{6B}$, it may give an indication of a center of the object 606 as the signal strength profile 612 reaches a local plateau at 613b. The region R2 between points 613e and 613g has a signal strength at or above $RS_{6C}$, and this region may be estimated to be where object 608 is located. At around point 613f, where the signal strength reaches the second plateau, it may give an indication of a center of the object 608. For the regions outside of the points 613a and 613h, they have a signal strength below $RS_{6A}$, and these regions may be deemed to be where no object is found. By tracking the signal strength profile 612 with respect to reference signal strengths, an object that exhibits relatively weak signal strength (e.g. object 606 in region R1) and an object that exhibits relatively strong signal strength (e.g. object 608 in region R2) can be detected and identified as a metal pipe and a wood stud, respectively.

According to aspects of the present invention, the rates of change of the signal strength profile 612 may also be employed to estimate locations of objects behind the opaque surface 604. In the example of FIG. 6C, the rate of change of the signal strength increases to approximately point 613a, reaching the level of $RS_{6A}$, indicating the scanner 602 is moving towards object 606. Then, the rate of change of the signal strength decreases after point 613a and continues to decrease after it passes the plateau at point 613b, indicating region R1 where object 606 may be behind the opaque surface 604. After points 613c and 613d, the rate of change of signal strength increases again to approximately point 613e, then it decreases after point 613e and continues to decrease after it passes points 613f and 613g, indicating region R2 where object 608 may be behind the opaque surface 604. After point 613g, the rate of change of signal strength continues to decrease below $RS_{6C}$, $RS_{6B}$, and $RS_{6A}$, indicating that the scanner 602 is moving away from object 608. By tracking the rate of change of the signal strength profile 612, an object that exhibits relatively weak signal strength (e.g. object 606 in region R1) and an object that exhibits relatively strong signal strength (e.g. object 608 in region R2) can be detected and identified as a metal pipe and a wood stud, respectively. Note that the method of tracking rate of change of the signal strength profile 612 may be combined with the method of tracking the signal strength profile 612 with respect to reference signal strengths to further improve the predictability of the objects behind the opaque surface 604.

Figure 7:
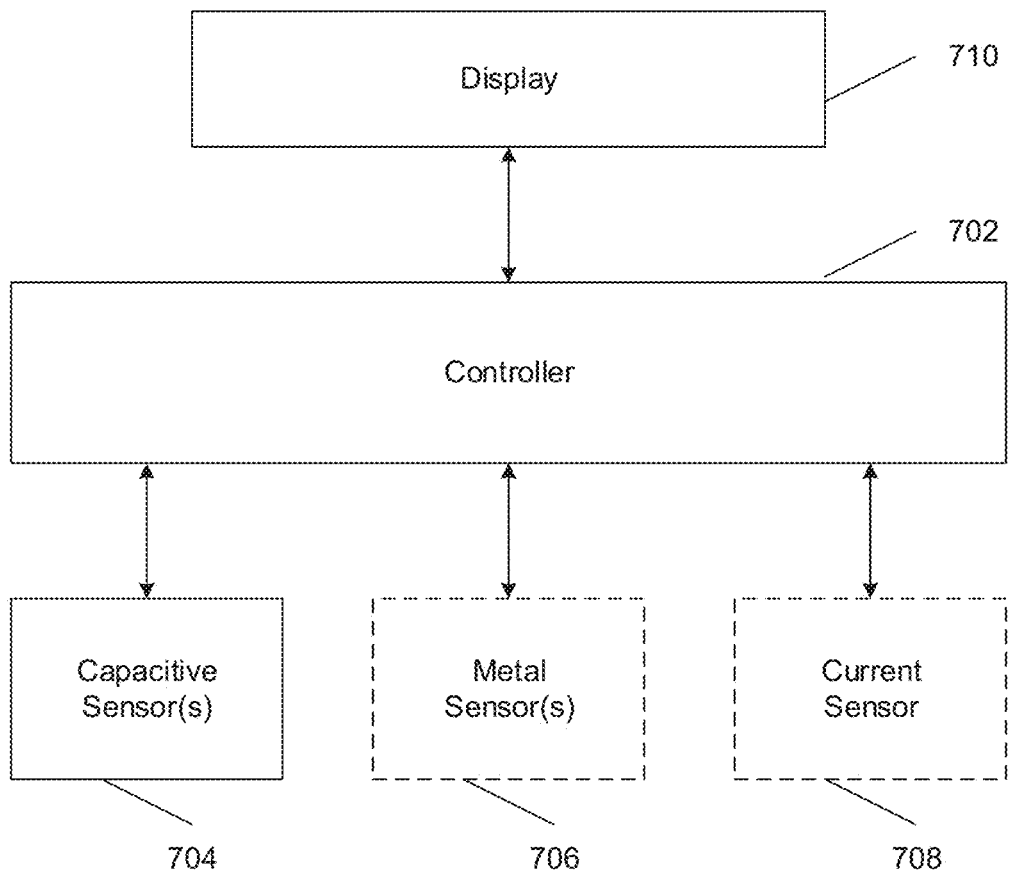
FIG. 7 illustrates a block diagram of an exemplary embodiment of a system for differentiating one or more objects behind an opaque surface using sensor data from different sensors according to aspects of the present invention.

FIG. 7 illustrates a block diagram of an exemplary embodiment of a system for differentiating one or more objects detected behind an opaque surface using sensor data from different sensors according to aspects of the present invention. In the exemplary system shown in FIG. 7, a controller 702 may be configured to process sensor data collected by sensors of the scanner, namely sensor data collected by capacitive sensors 704, metal sensors 706, and current sensors 708, or other types of sensors. In some implementations, the metal sensors 706 and/or the current sensors 708 may be optional in the system. The controller can further be configured to determine information about the detected objects behind the opaque surface based on the sensor data collected by capacitive sensors 704, metal sensors 706, and/or current sensors 708 in parallel. The controller may include one or more processors. A display 710 is configured to provide information about the detected objects to a user. In some other implementations, each type of the sensors, such as the capacitive sensor 704, the metal sensor 706, and the current sensor 708, can be turned on individually or in certain desired combination while the other types of sensors are turned off so that certain types of objects behind the opaque surface may be highlighted by such scans. The one or more processors can process the sensor data to differentiate the different objects detected, and select a certain particular object and disclose to the user its corresponding region based on the differences in density of the different objects detected.

According to aspects of the disclosure, the functional blocks described in the system of FIG. 7 may be implemented in an integrated device such as scanner 202 of FIG. 2A and scanner 302 of FIG. 3A. In other implementations, the capacitive sensors 704, metal sensors 706, and current sensor 708 may reside in one device, while the controller 702 and the display 710 may reside in another device. For example, a scanner device may include the sensors, and the sensor data collected by the scanner device may be wirelessly communicated to a second device. The second device, for example a smartphone, a tablet, or a laptop, may include the controller 702 and the display 710. In yet other implementations, the controller 702, the capacitive sensors 704, metal sensors 706, and current sensor 708, may reside in one device, while the display 710 may reside in another device. For example, a scanner device may include the controller 702 and the sensors, and the sensor data collected by the scanner device may be wirelessly communicated to a second device. The second device, for example a monitor, may be configured to receive and display the sensor data.

According to aspects of the present disclosure, examples of capacitive sensors and methods of operating the same are described in U.S. Pat. No. 5,619,128, entitled "STUD SENSOR WITH OVER-STUD MISCALIBRATION VIA CIRCUIT WHICH STORES AN INITIAL CALIBRATION DENSITY, COMPARES THAT TO A CURRENT TEST DENSITY AND OUTPUTS RESULT VIA INDICATOR," which is incorporated herein in its entirety by reference. Examples of metal sensors and methods of operating the same are described in U.S. Pat. No. 7,812,722, entitled "DUAL ORIENTATION METAL SCANNER," which is incorporated herein in its entirety by reference. Examples of current sensors and methods of operating the same are described in U.S. Pat. No. 6,933,712, entitled "ELECTRICAL CIRCUIT TRACING AND IDENTIFYING APPARATUS AND METHOD," which is incorporated herein in its entirety by reference. In one exemplary embodiment, current sensors may be able to detect electromagnetic fields generated by an alternating current. In another exemplary embodiment, current sensors may be able to detect the electromagnetic fields generated by a direct current.

Figure 8A:
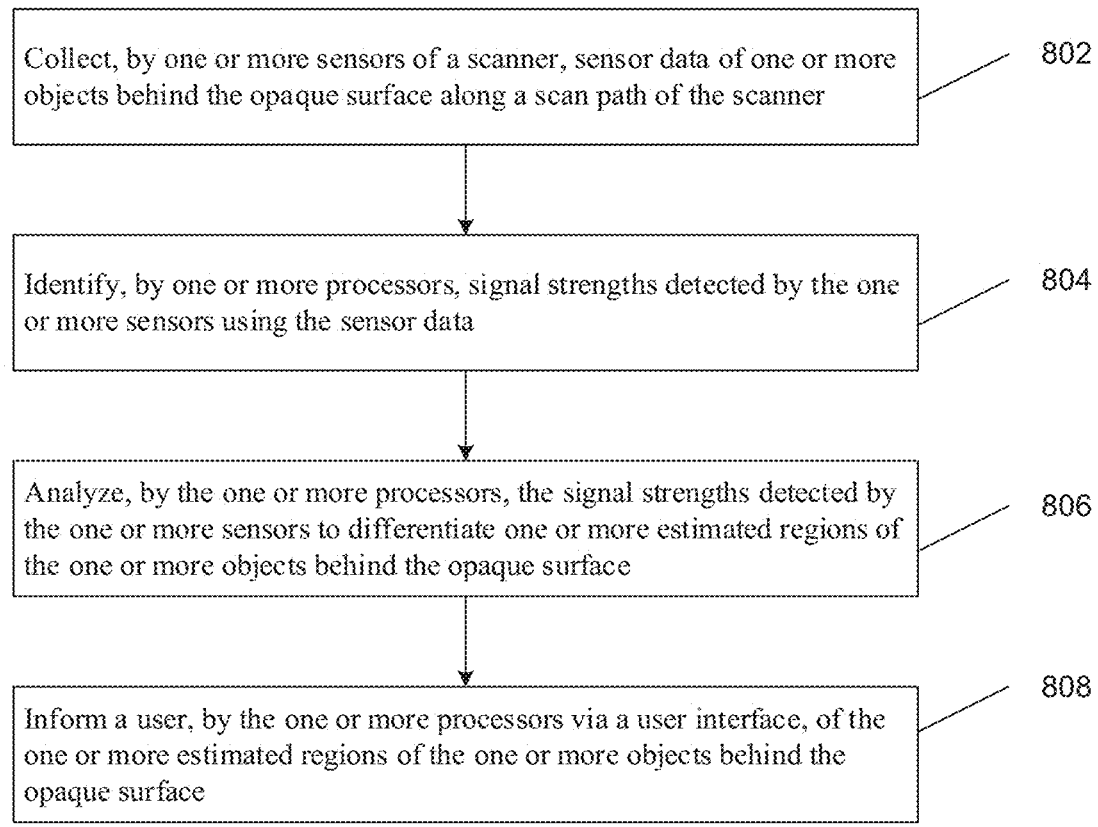
FIG. 8A illustrates a method of differentiating one or more objects detected behind an opaque surface using sensor data from different sensors according to aspects of the present invention.

FIG. 8A illustrates a method of differentiating one or more objects detected behind an opaque surface using sensor data from different sensors according to aspects of the present invention. As shown in FIG. 8A, in block 802, the method collects, by one or more sensors of a scanner, sensor data of the one or more objects behind an opaque surface along a scan path of the scanner. In block 804, the method identifies, by one or more processors of the scanner, signal strengths detected by the one or more sensors using the sensor data. In block 806, the method analyzes, by the one or more processors, the signal strengths detected by the one or more sensors to differentiate one or more estimated regions of the one or more objects behind the opaque surface. In block 808, the method informs a user, by the one or more processors via a user interface of the scanner, of the one or more estimated regions of the one or more objects behind the opaque surface.

According to aspects of the present disclosure, the one or more sensors may include at least a first set of sensors configured to detect a first type of material and a second set of sensors configured to detect a second type of material; and the estimated regions include a first estimated region of the first type of material and a second estimated region of the second type of material. The first set of sensors may include one or more capacitive sensors and the first type of material include wood studs; and the second set of sensors may include one or more metal sensors and the second type of material include metal objects. The plurality of sensors may further include a third set of sensors configured to detect a third type of material; where the third set of sensors includes one or more current sensors and the third type of material include electrical wires. The one or more sensors may include one or more capacitive sensors, metal sensors, and current sensors. According to aspects of the present disclosure, a set of sensors may include one or more sensors in the set. The method of collecting sensor data includes mapping the sensor data of the one or more objects behind the opaque surface with respect to a common reference point.

Figure 8B:
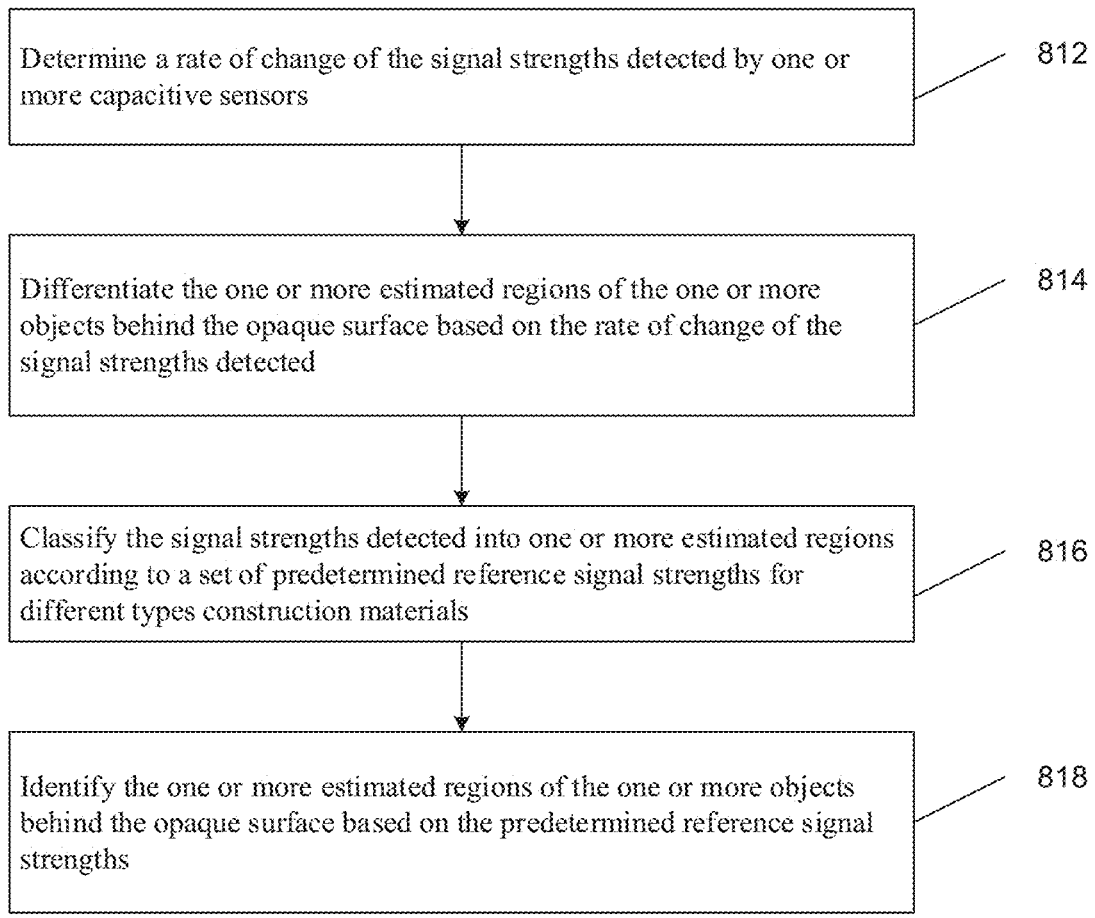
FIG. 8B illustrates a method of analyzing signal strengths detected by the one or more sensors to differentiate one or more estimated regions of the objects detected behind an opaque surface according to aspects of the present invention.

FIG. 8B illustrates a method of analyzing signal strengths detected by the one or more sensors to differentiate one or more estimated regions of the objects detected behind an opaque surface according to aspects of the present invention. In the exemplary embodiment of FIG. 8B, in block 812, the method determines a rate of change of the signal strengths detected by one or more capacitive sensors. In block 814, the method differentiates the one or more estimated regions of the one or more objects behind the opaque surface based on the rate of change of the signal strength detected.

According to aspects of the present disclosure, the rate of change of signal strengths may include a pattern of: a first increasing rate of change of signal strength, follow by a first decreasing rate of change of signal strength, where the first decreasing rate of change of signal strength occurs within close proximity of a first type of object behind the opaque surface. In some situations, for two or more objects within close proximity of each other, the rate of change of signal strength may further include a pattern of: a second increasing rate of change of signal strength, and then follow by a second decreasing rate of change of signal strength, where the second decreasing rate of change of signal strength occurs within close proximity of a second type of object behind the opaque surface. Depending on different situations, a close proximity of two objects may have a separation of an eighth of an inch to up to a few inches.

According to aspects of the present disclosure, the methods performed in block 812 and block 814 may additionally or optionally include the methods performed in block 816 and block 818. In block 816, the method classifies the signal strengths detected into one or more estimated regions according to a set of predetermined reference signal strengths for different types of construction materials. In block 818, the method identifies the one or more estimated regions of the one or more objects behind the opaque surface based on the predetermined reference signal strengths. In some implementations, the set of predetermined reference signal strengths may include a reference signal strength for a stud, a reference signal strength for an electrical wire, a reference signal strength for a metal pipe, and a reference signal strength for a plastic pipe.

Figure 8C:
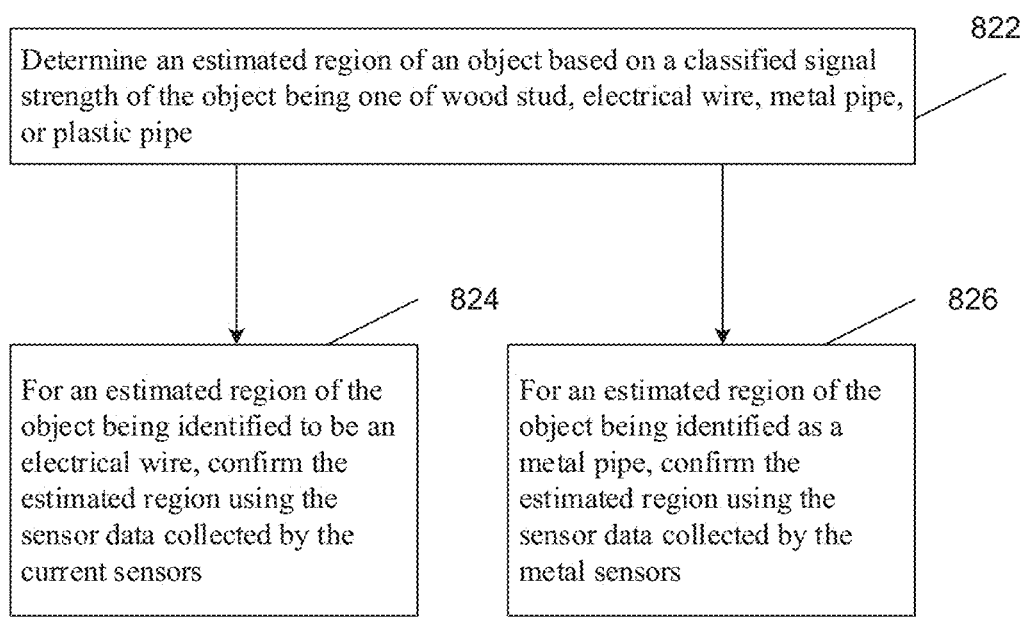
FIG. 8C illustrates additional methods of analyzing signal strengths detected by the one or more sensors of FIG. 8B according to aspects of the present invention.

FIG. 8C illustrates additional methods of analyzing signal strengths detected by the one or more sensors of FIG. 8B according to aspects of the present invention. In block 822, the method determines an estimated region of an object based on a classified signal strength of the object being one of wood stud, electrical wire, metal pipe, or plastic pipe. The methods performed in block 822 may further include the methods performed in block 824 or block 826. In block 824, for an estimated region of the object being identified to be an electrical wire, the method may confirm the estimated region using the sensor data collected by the current sensors. In block 826, for an estimated region of the object being identified as a metal pipe, the method may confirm the estimated region using the sensor data collected by the metal sensors.

It will be appreciated that the above descriptions for clarity have described embodiments of the invention with reference to different functional units and controllers. However, it will be apparent that any suitable distribution of functionality between different functional units or processors or controllers may be used without detracting from the invention. For example, functionality illustrated to be performed by separate processor(s) or controller(s) may be performed by the same processor(s) and/or controller(s) included with the unit. In another exemplary embodiment, functionality illustrated to be performed by the processor and/or controller or the display may be performed by an independent and/or remote receiving device that may be able to display the information and/or provide a means accessible to the user. Hence, references to specific functional units are to be seen as references to suitable means for providing the described functionality rather than indicative of a strict logical or physical structure or organization.

The invention can be implemented in any suitable form, including hardware, software, firmware, or any combination of these. The invention may optionally be implemented partly as computer software running on one or more data processors and/or digital signal processors, along with the hardware components described above. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors/controllers.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

What is claimed is:

1. A scanner for differentiating a plurality of objects detected behind an opaque surface, comprising:
    a plurality of sensors, controlled by one or more processors, configured to collect sensor data of the plurality of objects behind an opaque surface in parallel along a scan path of the scanner;
    the one or more processors are configured to identify signal strengths detected by the plurality of sensors using the sensor data, wherein the signal strengths detected include combined signal strengths of a plurality of different types of objects;
    the one or more processors are further configured to analyze the signal strengths detected by the plurality of sensors to differentiate a plurality of estimated regions of the plurality of objects behind the opaque surface, wherein the plurality of estimated regions include estimated regions for the plurality of different types of objects;
    the one or more processors are further configured to indicate proximity of the plurality of different types of objects using the estimated regions; and
    the one or more processors are further configured to inform a user, via a user interface, of the plurality of estimated regions of the plurality of types of objects behind the opaque surface.

2. The scanner of claim 1,
wherein the plurality of sensors comprise
one or more capacitive sensors configured to collect sensor data associated with density of objects,
metal sensors configured to collect sensor data associated with metal objects, and
current sensors configured to collect sensor data associated with electrical circuits behind the opaque surface.

3. The scanner of claim 1, wherein the one or more processors are further configured to:
    determine a rate of change of the signal strengths detected by one or more capacitive sensors; and
    differentiate the plurality of estimated regions of the plurality of objects behind the opaque surface based on the rate of change of the signal strengths detected.

4. The scanner of claim 3, wherein the rate of change of signal strengths comprises a pattern of:
    a first increasing rate of change of signal strength, follow by a first decreasing rate of change of signal strength, wherein the first decreasing rate of change of signal strength occurs within close proximity of a first type of object behind the opaque surface.

5. The scanner of claim 4, wherein for two or more objects within close proximity of each other, the rate of change of signal strength further comprises a pattern of:
    a second increasing rate of change of signal strength, and then follow by a second decreasing rate of change of signal strength, wherein the second decreasing rate of change of signal strength occurs within close proximity of a second type of object behind the opaque surface.

6. The scanner of claim 3, wherein the one or more processors are further configured to:
    classify the signal strengths detected into the plurality of estimated regions according to a set of predetermined reference signal strengths for different types of construction materials; and
    identify the plurality of estimated regions of the plurality of objects behind the opaque surface based on the predetermined reference signal strengths.

7. The scanner of claim 6, wherein the set of predetermined reference signal strengths comprises:
    a reference signal strength for a stud;
    a reference signal strength for an electrical wire;
    a reference signal strength for a metal pipe; and
    a reference signal strength for a plastic pipe.

8. The scanner of claim 7, wherein the one or more processors are further configured to:
    determine an estimated region of an object based on a classified signal strength of the object being one of wood stud, electrical wire, metal pipe, or plastic pipe.

9. The method of claim 8, wherein the one or more processors are further configured to:
    for an estimated region of the object being identified to be an electrical wire, confirm the estimated region using the sensor data collected by the current sensors.

10. The scanner of claim 8, wherein the one or more processors are further configured to:
    for an estimated region of the object being identified as a metal pipe, confirm the estimated region using the sensor data collected by the metal sensors.

11. A method for differentiating a plurality of objects detected behind an opaque surface, comprising:
    collecting, by a plurality of sensors of a scanner, sensor data of the plurality of objects behind an opaque surface in parallel along a scan path of the scanner;
    identifying, by one or more processors of the scanner, signal strengths detected by the plurality of sensors using the sensor data, wherein the signal strengths detected include combined signal strengths of a plurality of different types of objects;
    analyzing, by the one or more processors, the signal strengths detected by the plurality of sensors to differentiate a plurality of estimated regions of the plurality of objects behind the opaque surface, wherein the plurality of estimated regions include estimated regions for the plurality of different types of objects;
    indicating, by the one or more processors, proximity of the plurality of different types of objects using the estimated regions, and
    informing a user, by the one or more processors via a user interface of the scanner, of the plurality of estimated regions of the plurality of different types of objects behind the opaque surface.

12. The method of claim 11,
wherein the plurality of sensors comprise
one or more capacitive sensors configured to collect sensor data associated with density of objects,
metal sensors configured to collect sensor data associated with metal objects, and current sensors configured to collect sensor data associated with electrical circuits behind the opaque surface.

13. The method of claim 11, wherein analyzing the signal strengths detected by the plurality of sensors further comprises:
    determining a rate of change of the signal strengths detected by one or more capacitive sensors; and
    differentiating the plurality of estimated regions of the plurality of objects behind the opaque surface based on the rate of change of the signal strengths detected.

14. The method of claim 13, wherein the rate of change of signal strengths comprises a pattern of:
    a first increasing rate of change of signal strength, follow by a first decreasing rate of change of signal strength, wherein the first decreasing rate of change of signal strength occurs within close proximity of a first type of object behind the opaque surface.

15. The method of claim 14, wherein for two or more objects within close proximity of each other, the rate of change of signal strength further comprises a pattern of:
    a second increasing rate of change of signal strength, and then follow by a second decreasing rate of change of signal strength, wherein the second decreasing rate of change of signal strength occurs within close proximity of a second type of object behind the opaque surface.

16. The method of claim 13, wherein analyzing the signal strengths detected by the plurality of sensors further comprises:
    classifying the signal strengths detected into the plurality of estimated regions according to a set of predetermined reference signal strengths for different types of construction materials; and
    identifying the plurality of estimated regions of the plurality of objects behind the opaque surface based on the predetermined reference signal strengths.

17. The method of claim 16, wherein the set of predetermined reference signal strengths comprises:
    a reference signal strength for a stud;
    a reference signal strength for an electrical wire;
    a reference signal strength for a metal pipe; and
    a reference signal strength for a plastic pipe.

18. The method of claim 17, further comprising:
    determining an estimated region of an object based on a classified signal strength of the object being one of wood stud, electrical wire, metal pipe, or plastic pipe.

19. The method of claim 18, further comprising:
    for an estimated region of the object being identified to be an electrical wire, confirming the estimated region using the sensor data collected by the current sensors.

20. The method of claim 18, further comprising:
    for an estimated region of the object being identified as a metal pipe, confirming the estimated region using the sensor data collected by the metal sensors.

* * * * *